United States Patent
Kapic et al.

(10) Patent No.: US 9,573,162 B2
(45) Date of Patent: Feb. 21, 2017

(54) PROCESSES AND COMPOSITIONS FOR IMPROVING CORROSION PERFORMANCE OF ZIRCONIUM OXIDE PRETREATED ZINC SURFACES

(71) Applicant: HENKEL AG & CO. KGAA, Duesseldorf (DE)

(72) Inventors: Edis Kapic, Sterling Heights, MI (US); Bruce H. Goodreau, Romeo, MI (US); Alvaro Bobadilla, Royal Oak, MI (US); Michael Febbraro, Knoxville, TN (US)

(73) Assignee: Henkel AG & Co., KGaA, Duesseldorf (DE)

( * ) Notice: Subject to any disclaimer, the term of this patent is extended or adjusted under 35 U.S.C. 154(b) by 0 days.

(21) Appl. No.: 13/796,052

(22) Filed: Mar. 12, 2013

(65) Prior Publication Data

US 2013/0202911 A1   Aug. 8, 2013

Related U.S. Application Data

(63) Continuation of application No. PCT/US2012/024311, filed on Feb. 8, 2012.

(60) Provisional application No. 61/440,657, filed on Feb. 8, 2011.

(51) Int. Cl.

| | | |
|---|---|---|
| *C23C 22/00* | (2006.01) | |
| *B05D 3/00* | (2006.01) | |
| *B32B 15/04* | (2006.01) | |
| *C23C 22/34* | (2006.01) | |
| *C23C 22/78* | (2006.01) | |
| *C23C 22/83* | (2006.01) | |
| *C23C 22/60* | (2006.01) | |
| *C23C 22/62* | (2006.01) | |
| *C23C 22/66* | (2006.01) | |
| *C23C 22/73* | (2006.01) | |

(52) U.S. Cl.
CPC ............ *B05D 3/002* (2013.01); *B32B 15/04* (2013.01); *C23C 22/34* (2013.01); *C23C 22/60* (2013.01); *C23C 22/62* (2013.01); *C23C 22/66* (2013.01); *C23C 22/73* (2013.01); *C23C 22/78* (2013.01); *C23C 22/83* (2013.01); *Y10T 428/12611* (2015.01)

(58) Field of Classification Search
USPC .................................................. 427/327–330
See application file for complete search history.

(56) References Cited

U.S. PATENT DOCUMENTS

| | | | | |
|---|---|---|---|---|
| 3,444,007 | A * | 5/1969 | Maurer et al. ................ | 148/273 |
| 3,515,600 | A * | 6/1970 | Ellis ........................ | C23C 22/60 |
| | | | | 148/261 |
| 3,620,949 | A * | 11/1971 | Morrison et al. ............ | 204/486 |
| 3,756,864 | A | 9/1973 | Zaccagnini | |
| 3,929,514 | A * | 12/1975 | Houlihan et al. ............ | 148/273 |
| 4,381,203 | A * | 4/1983 | Reinhold ...................... | 148/270 |
| 4,801,337 | A * | 1/1989 | Higgins ...................... | 148/267 |
| 5,294,266 | A * | 3/1994 | Hauffe et al. ................ | 148/247 |
| 2010/0009083 | A1 | 1/2010 | Cano-Iranzo et al. | |
| 2011/0100830 | A1 * | 5/2011 | Ishii et al. ................... | 205/238 |

FOREIGN PATENT DOCUMENTS

| | | |
|---|---|---|
| EP | 1484432 | 12/2004 |
| WO | WO 2010004651 A1 * | 1/2010 |

OTHER PUBLICATIONS

International Search Report for PCT/US2012/024311 dated Oct. 4, 2012, 3 pages.

* cited by examiner

*Primary Examiner* — David Turocy
(74) *Attorney, Agent, or Firm* — Mary K. Cameron

(57) ABSTRACT

A method of improving corrosion resistance of a metal substrate comprising a zinc surface coated with zirconium oxide conversion coating by, prior to conversion coating, contacting the zinc surface with a composition comprising:
 a) iron(III) ions,
 b) a source of hydroxide ion;
 c) at least one complexing agent selected from organic compounds which have at least one functional group —COOX, wherein X represents either a H or an alkali and/or alkaline earth metal;
 d) 0.0 to about 4 g/l cobalt (II) ions; and
 optionally
 e) a source of silicate:
wherein the composition has a pH of at least 10.

16 Claims, 4 Drawing Sheets

PROCESSES AND COMPOSITIONS FOR IMPROVING CORROSION PERFORMANCE OF ZIRCONIUM OXIDE PRETREATED ZINC SURFACES

CROSS-REFERENCE TO RELATED APPLICATIONS

NONE

FIELD OF THE INVENTION

This invention relates to methods of improving corrosion performance of zirconium oxide conversion coatings deposited on zinc-containing surfaces by pre-treating the zinc-containing surfaces with a composition containing cobalt and/or iron before contacting with a zirconium oxide forming conversion coating composition. More particularly, the invention relates to a multi-step coating process and bath compositions used therein which provide improved corrosion performance, particularly cyclic corrosion, on zinc-containing surfaces, such as Hot Dip Galvanized (hereinafter referred to as HDG) and Electro Galvanized (hereinafter referred to as EG) substrates. The invention also provides concentrate compositions for use in the bath, methods of making and using the concentrate and bath, as well as metal articles comprising a coating according to the invention.

BACKGROUND OF THE INVENTION

There are currently in the market a number of zirconium oxide depositing conversion coating products intended to replace zinc phosphate products in automotive assembly lines. These known products are used to coat ferrous metal surfaces as well as aluminum and zinc containing surfaces.

An issue for current zirconium oxide conversion coating processes is that they do not provide as good corrosion protection as conventional zinc phosphate processes under some circumstances and on some substrates.

One particular problem has been that current processes for zirconium oxide conversion coating of zinc-containing substrates, in particular HDG and EG, do not provide coated metal articles that meet certain automotive testing requirements. Hot Dip Galvanized (HDG) and Electro Galvanized (EG) steel substrates treated with a commercially available zirconium oxide pretreatment baths exhibited weaker performance in two separate automotive industry corrosion tests when compared to the conventional Bonderite® zinc phosphate treatments currently used in the automotive industry. Thus there is a need for a process of coating these substrates with a zirconium oxide conversion coating that provides for improved corrosion performance of zirconium oxide conversion coatings on HDG and EG substrates.

The instant invention solves one or more to the above problems in zirconium oxide coating processes by including at least one pre-treating step, where the zinc-containing surfaces are contacted with a composition, for example a cleaner and/or a pre-rinse, containing cobalt and/or iron, in the zirconium oxide conversion coating processes.

SUMMARY OF THE INVENTION

In one embodiment, the invention provides a method for improving corrosion performance of a metal substrate comprising steps of:
1.) providing a metal substrate comprising at least one zinc or zinc alloy surface;
2.) contacting said surface with an alkaline pre-rinse composition comprising:
   a) iron(III) ions,
   b) a source of hydroxide ion;
   c) at least one complexing agent selected from organic compounds which have at least one functional group —COOX, wherein X represents either a H or an alkali and/or alkaline earth metal;
   d) 0.0 to about 4 g/l cobalt (II) ions; and optionally
   e) a source of silicate:
   wherein the composition has a pH of at least 10;
3.) optionally rinsing said surface;
4.) applying to the metal substrate a zirconium-based metal pretreatment coating composition comprising zirconium, thereby forming a pretreatment coating on the metal substrate; and
5.) optionally applying a paint to the metal pretreatment coated metal substrate.

In another embodiment the invention provides the aqueous alkaline composition s utilized in the method. These compositions and methods may provide an aqueous alkaline composition containing cobalt (II) ions present in an amount of 1 ppm up to the solubility limit of the cobalt (II) ions, and as shown in the Examples may be phosphate-free, with low levels or no silicates.

In one embodiment of the method contact time of step 2.) is from 10 to 60 seconds and the alkaline pre-rinse composition has a temperature of 85 to 125 degrees F.

In another embodiment the compositions and methods may include zirconium-based metal pretreatment coating composition further comprising fluoride and a chelating agent. In one embodiment, the zirconium-based metal pretreatment coating composition comprises 50 to 300 ppm of dissolved Zr, 0 to 50 ppm of dissolved Cu, 0 to 100 ppm of $SiO_2$, 150 to 2000 ppm of total Fluoride, 10 to 100 ppm of free Fluoride and optionally a chelating agent.

In another aspect of the invention, a coated metal article is provided which comprises:
   A) a steel substrate;
   B) a first layer comprising a zinc or zinc alloy metal surface deposited on the steel substrate;
   C) a second layer deposited on said zinc or zinc alloy metal surface by contact with a composition of the invention;
   D) a third layer comprising zirconium oxide deposited by contacting the second layer with a zirconium-based metal pretreatment coating composition comprising dissolved Zr; and
   E) a fourth layer comprising at least one paint;
   wherein said coated metal article has better resistance to cyclic corrosion than a comparative metal article coated with the first layer, the zirconium-based metal pretreatment coating composition comprising dissolved Zr and the at least one paint in the absence of C).

BRIEF DESCRIPTION OF THE DRAWINGS

FIG. 1 shows a series of histogram comparison graphs of performance in cyclic corrosion test GM9540P by four different substrates treated according to three processes as described in Example 1.

FIG. 2 shows a series of histogram comparison graphs of performance in cyclic corrosion test APGE by four different substrates treated according to three processes as described in Example 2.

DETAILED DESCRIPTION OF PREFERRED EMBODIMENTS

Figure 1A:
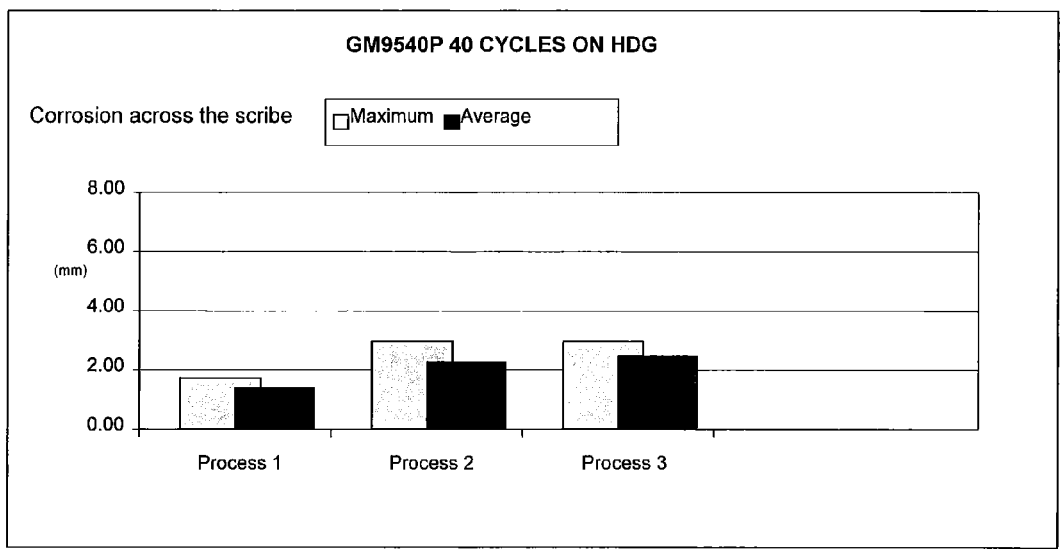
FIG. 1A shows corrosion test performance of hot-dip galvanized (HDG) steel panels.

In seeking to modify the HDG and EG surfaces, which are mostly zinc, to improve corrosion performance Applicants have developed alkaline compositions containing cobalt and/or iron, useful as pre-rinses and cleaners, for pretreating HDG and EG substrates prior to contacting the substrates with zirconium oxide generating conversion coating baths, which provide improved corrosion resistance to the zirconium oxide coated substrate.

One aspect of the invention comprises an aqueous alkaline composition, which comprises, consists essentially of, or consists of:
a) iron(III) ions,
b) a source of hydroxide ion;
c) at least one complexing agent selected from organic compounds which have at least one functional group —COOX, wherein X represents either a H or an alkali and/or alkaline earth metal; and optionally
d) 0.0 to about 4 g/l cobalt (II) ions;
e) a source of silicate:
wherein the composition has a pH of at least 10.

Also provided are processes of coating a metal substrate comprising at least one zinc or zinc alloy surface, whereby corrosion performance of the metal substrate is improved comprising the steps of:
1) providing a metal substrate, e.g. a steel substrate, comprising at least one zinc or zinc alloy surface;
2) contacting said surface with a composition comprising:
a) iron(III) ions,
b) a source of hydroxide ion;
c) at least one complexing agent selected from organic compounds which have at least one functional group —COOX, wherein X represents either a H or an alkali and/or alkaline earth metal; and optionally
d) 0.0 to about 4 g/l cobalt (II) ions;
e) a source of silicate:
wherein the composition has a pH of at least 10;
3.) optionally rinsing said surface;
4.) applying to the metal substrate a zirconium-based metal pretreatment coating composition comprising 50 to 300 ppm of dissolved Zr, 0 to 50 ppm of dissolved Cu, 0 to 100 ppm of $SiO_2$, 150 to 2000 ppm of total Fluoride, 10 to 100 ppm of free Fluoride and optionally a chelating agent, thereby forming a pretreatment coating on the metal substrate; and
5.) optionally applying a paint to the metal pretreatment coated metal substrate.

HDG and EG steel substrates contacted with cobalt and/or iron containing compositions, e.g. alkaline cleaners and/or pre-rinses, prior to coating with commercially available zirconium oxide pretreatment bath showed improved corrosion performance cyclic corrosion tests.

A typical process for producing a finished zirconium oxide coated substrate having a zinc-containing surface will include the following steps in order: application of a cleaner solution; rinse in warm water; application of an anti-corrosion conversion coating; deionized water rinse; compressed air drying of the substrate; application of an initial paint layer by electrodeposition generally with baking; application of a primer layer; application of a basecoat paint layer; and finally application of a clearcoat paint layer. The term "paint" being understood to mean any one of these layers and combinations thereof. In the instant invention, the process is changed by either using a cleaner solution according to the invention that comprises cobalt and/or iron, adding an alkaline pre-rinse step between cleaning and anti-corrosion conversion coating, wherein the alkaline pre-rinse contain cobalt and/or iron or both. The inclusion of cobalt and/or iron provided unexpected changes in corrosion performance to the zirconium oxide conversion coated zinc surface.

Generally, cleaner solutions are comprised of components to achieve alkaline pH, generally providing high levels of silicate and/or phosphate, for example 2-20 wt %, and have no actively added iron or cobalt in the cleaner, unlike those described as preferred for the present invention. In one embodiment, cleaner compositions of the invention may be applied by spraying onto the substrate followed by an immersion in the cleaner bath with agitation. In another embodiment, the substrate may be immersed in the inventive composition, removed and optionally rinsed with distilled water, prior to conversion coating.

In one embodiment, the present inventors have surprisingly found that modification of an alkaline cleaner composition by addition of cobalt and/or iron can lead to enhanced corrosion resistance of zinc-containing surfaces that are subsequently coated with an anti-corrosion pretreatment, for example a zirconium oxide conversion coating, and painted per industry standards.

Compositions, e.g. aqueous cleaners and pre-rinses, according to the invention comprise:
a) iron(III) ions,
b) a source of hydroxide ion;
c) at least one complexing agent selected from organic compounds which have at least one functional group —COOX, wherein X represents either a H or an alkali and/or alkaline earth metal; and optionally
d) 0.0 to about 4 g/l cobalt (II) ions;
e) a source of silicate:
wherein the composition has a pH of at least 10.

Component a) iron(III) ions is generally present in an amount, in increasing order of preference, of about 5, 10, 15, 20, 25, 30, 40, 50, 60, 70, 80, 90, or 100 ppm and at most in increasing order of preference about 500, 400, 350, 300, 250, 200, 150 ppm. Suitable sources of the iron (III) ions are water soluble or alkali soluble salts of iron, such as by way of non-limiting example ferric nitrate, ferric sulfate, ferric ammonium citrate, ferric citrate, ferric ammonium sulfate and ferric chloride. Ferric nitrate and ferric sulfate are preferred.

Component b) the source of hydroxide ion is generally present in an amount, in increasing order of preference, of about 0.5, 0.75, 1, 1.5, 2, 2.5 g/l and at most in increasing order of preference about 4.0, 3.5, 3.0, 2.75 g/l. Greater amounts of hydroxide source may be used provided that the composition does not cause undue etching of the substrate. Suitable sources are water soluble alkali metal or ammonium hydroxide salts, preferably NaOH or KOH.

Component c) the one or more complexing agents are generally present in an amount, in increasing order of preference, of about 30, 40, 50, 60, 70, 80, 90, or 100 ppm and at most in increasing order of preference about 500, 400, 350, 300, 250, 200, 150 ppm.

Suitable sources of complexing agents are those selected from water soluble organic compounds which have at least one functional group —COOX, wherein X represents either a H or an alkali and/or alkaline earth metal. In one embodiment, the complexing agents are selected from mono- and/or di-carboxylic acids and salts thereof, optionally having one or more hydroxide moieties.

Optional component d) cobalt (II) ions concentration ranges from 0.0 to about 4 g/l cobalt (II) ions. If present, cobalt is generally advantageous in an amount, in increasing order of preference, of about 1, 2, 3, 4, 5, 6, 7, 8, 9, 10, 11, 12, 14, 16, 20, 25, 50 ppm and at most in increasing order of preference of about 200, 150, 100, 75, 60 ppm. Greater amounts may be added up to the solubility limit of the cobalt. Suitable sources of cobalt ions are those compounds of cobalt that are water and or alkali soluble, for example cobalt nitrate, cobalt sulfate, cobaltous citrate, cobalt oxide, cobalt chloride. Cobalt nitrate and sulfate are preferred.

Optional Component e) the source of silicate is generally present in an amount of sufficient to provide silicate in an amount, in increasing order of preference, of about 30, 40, 50, 60, 70, 80, 90, 100, 150, 200, 250, or 300 ppm and at most in increasing order of preference about 1000, 900, 800, 700, 600, 500, 400, or 350 ppm. Suitable sources of silicate include water soluble silicates, such as alkali metal silicates. Sodium silicate and potassium silicate are preferred.

The compositions of the invention are alkaline and may have a pH of at least in increasing order of preference 10, 10.5, 11, 11.5, 12 and at most in increasing order of preference 13.5, 13, 12.5. Generally, this pH is obtained by presence in the bath of about 0.5-3 g/L OH.

Use conditions for compositions according to the invention are at temperatures, in increasing order of preference, of about 85, 90, 95, 100, 105, 110, 120° F. and at most in increasing order of preference about 125, 130, 135, 140, 145, 150, 155, 160° F., that is about 30, 35, 40, 45, 50, 55, 60, 65 or 70° C.

The zinc or zinc alloy surface to be coated with a zirconium oxide coating is typically optionally cleaned with a conventional cleaner and then contacted with a composition according to the invention for a period of 10, 15, 20, 25, 30, 45, 60 seconds, followed by rinsing. The full process can be seen in the examples below.

The zirconium containing pretreatment coating may be applied via spray, immersion bath or both for a period of time generally ranging from 30 to 180 seconds. Typically the exposure occurs at ambient temperature, and may be at temperatures of about 10-50° C., usually 20-30° C. or 25° C.

Concentrations given above are those for the working bath, except where indicated otherwise. Concentrates for making the working bath may be provided at concentrations of 1× to 20× of the concentrations given for the working bath, provided that the increase in concentration does not cause precipitation or instability of the concentrate. Desirably the concentrates are stable if they do not precipitate or coagulate upon storage at ambient temperature for at least 30, 45, 60, 90, 120 days.

Other than in the operating examples, or where otherwise indicated, all numbers expressing quantities of ingredients, reaction conditions, or defining ingredient parameters used herein are to be understood as modified in all instances by the term "about". Unless otherwise indicated, all ratios and percentages are percent by weight.

EXAMPLES

Laboratory test results showed that an alkaline pre-rinse according to the invention improved the cyclic corrosion performance of EG and HDG coated with a zirconium oxide conversion coating.

Example 1

The processes tested included:

| Process 1 | Bonderite 958 (commercially available zinc phosphate: control) |
| Process 2 | TD-1323-HB/HC standard process (control) |
| Process 3 | Alkaline Co/Fe pre-rinse + TD-1323-HB/HC |
| Process 4 | Fe containing cleaner + TD-1323-HB/HC |
| Process 5 | Co/Fe containing cleaner + TD-1323-HB/HC |

* TD-1323-HB/HC is a commercially available zirconium oxide pretreatment bath.

Standard (12"×4") test panels were obtained from ACT Laboratories, Hillsdale, Mich. USA; Cold Rolled Steel (CRS), Electro-Galvanized Steel (EG), Aluminum 6111 (AL6111), Hot Dip Galvanized Steel (HDG). Panels of each of the four substrates were treated according to one of the below processes. The process steps for testing of the pre-rinse were as follows:

Process 1 (Control) Bonderite 958
1. Parco Cleaner 1533—120 sec. (Spray)
2. Warm Water Rinse—30 sec. (Spray)
3. Fixodine Z8—30 sec. (Spray)
4. Bonderite 958 (zinc phosphating)—120 sec. (Immersion)
5. Cold Water Rinse—30 sec. (Spray)
6. Parcolene 91—60 sec. (Spray)
7. DIW Rinse—30 sec. (Spray)

Process 2 (Control) TD-1323-HB
1. Parco Cleaner 1533—120 sec. (Spray)
2. Warm Water Rinse—30 sec. (Spray)
3. DIW Rinse—30 sec. (Spray)
4. TD-1323-HB—90 sec. (Immersion)
5. Cold Water Rinse—30 sec. (Spray)
6. DIW Rinse—30 sec. (Spray)

Process 3 TD-1323-HB+Alkaline Co/Fe Pre-Rinse
1. Parco Cleaner 1533—120 sec. (Spray)
2. Warm Water Rinse—30 sec. (Spray)
3. Alkaline Co/Fe pre-rinse 9% v/v of concentrate—15 sec. (Spray)
4. Warm Water Rinse—30 sec. (Spray)
5. DIW Rinse—30 sec. (Spray)
6. TD-1323-HB—90 sec. (Immersion)
7. Cold Water Rinse—30 sec. (Spray)
8. DIW Rinse—30 sec. (Spray)

TABLE 1

| Alkaline Co/Fe Pre-rinse Concentrate | |
|---|---|
| Water tap | 50.921 |
| Chelant (complexing agent) Sodium salt of carboxylic acid | 1.979 |
| Cobalt(II)nitrate solution (13 wt % Co) | 1.900 |
| Iron(III)nitrate 9H$_2$O (14 wt % Fe) | 1.300 |
| Sodium hydroxide 50% Solution | 43.900 |
| Total | 100.000 |

The test panels were painted, the paint was allowed to cure and the panels were subjected to either 40 cycles of GM9540P corrosion testing or 50 cycles of APGE testing. Both of these cyclic corrosion tests are standard automotive industry cyclic corrosion tests known to those of skill in the art.

TABLE 2

APGE Results

| | Corrosion (mm) | |
|---|---|---|
| | Average | Maximum |
| Process 1 (Control) Bonderite 958 | | |
| HDG | 5.4 | 2.8 |
| EG | 9.5 | 3.8 |
| CRS | 0.6 | 0.7 |
| AL6111 | 0.8 | 5.7 |
| Process 2 (Control) TD-1323-HB | | |
| HDG | 6.1 | 11.0 |
| EG | 4.7 | 7.2 |
| CRS | 9.2 | 12.3 |
| AL6111 | 0.6 | 4.3 |
| Process 3 TD-1323-HB + Alkaline Pre-rinse | | |
| HDG | 2.7 | 3.6 |
| EG | 1.7 | 2.7 |
| CRS | 6.8 | 9.8 |
| AL6111 | 2.0 | 9.1 |

GM9540P Results

| | Corrosion (mm) | |
|---|---|---|
| | Average | Maximum |
| Process 1 (Control) Bonderite 958 | | |
| HDG | 1.4 | 1.8 |
| EG | 1.7 | 1.8 |
| CRS | 2.6 | 2.8 |
| AL6111 | 0.5 | 0.6 |
| Process 2 (Control) TD-1323-HB | | |
| HDG | 2.3 | 3.0 |
| EG | 2.6 | 3.1 |
| CRS | 6.0 | 6.6 |
| AL6111 | 0.6 | 0.9 |
| Process 3 TD-1323-HB + Alkaline Pre-rinse | | |
| HDG | 1.2 | 1.5 |
| EG | 2.5 | 2.9 |
| CRS | 5.0 | 5.2 |
| AL6111 | 0.3 | 0.5 |

Figure 1B:
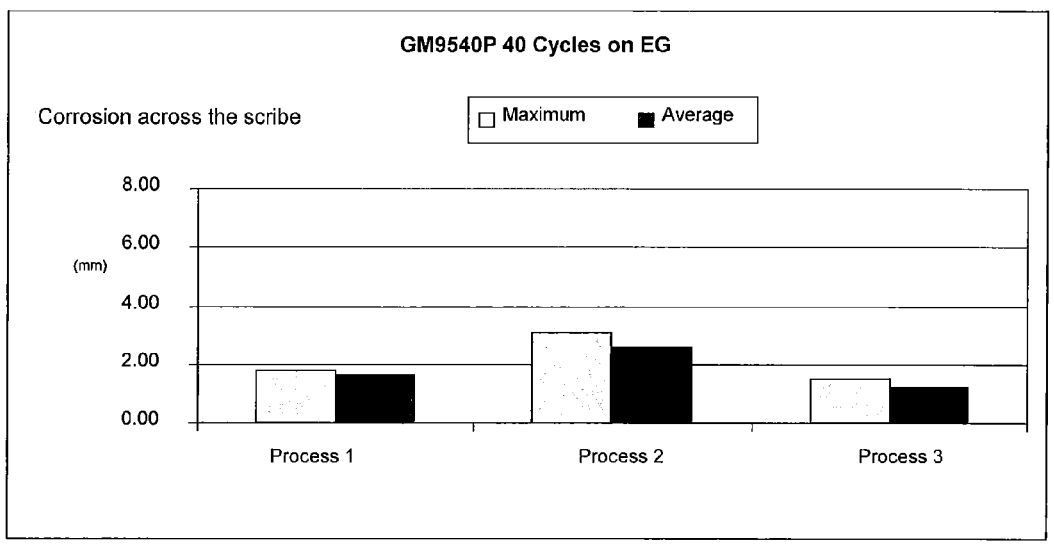
FIG. 1B shows corrosion test performance of electro galvanized (EG) steel panels.
Figure 1C:
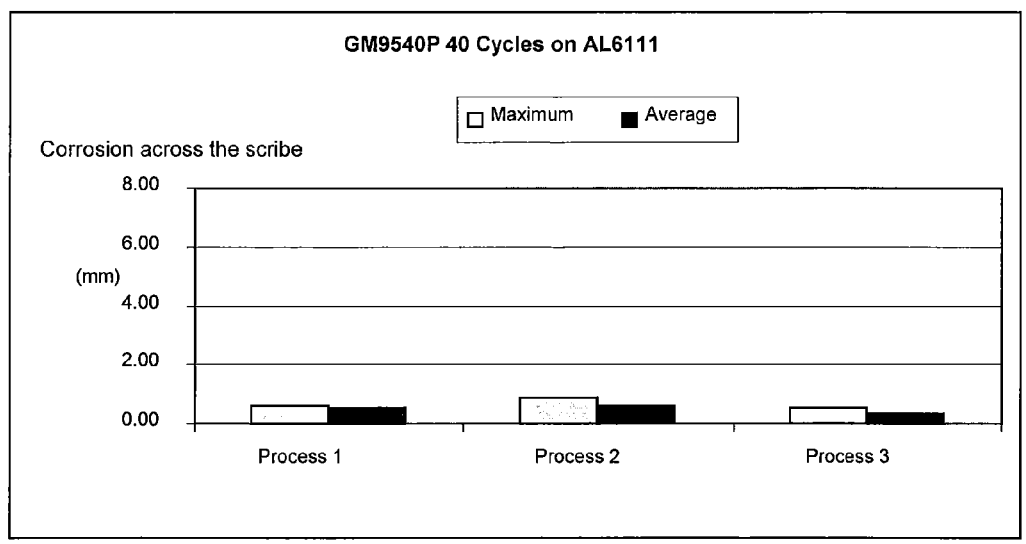
FIG. 1C shows corrosion test performance of aluminum alloy panels (Al6111)
Figure 1D:
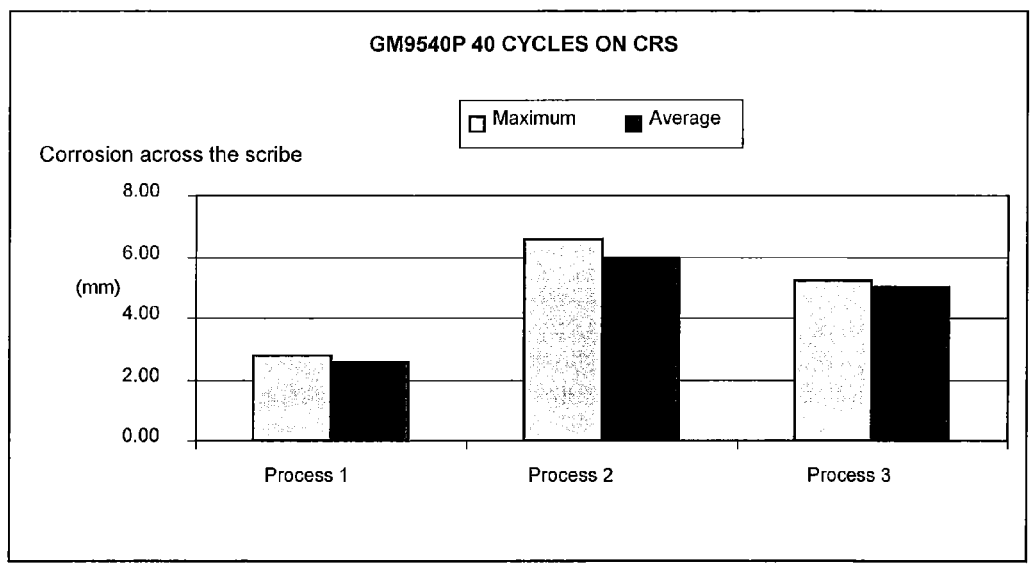
FIG. 1D shows corrosion test performance of cold rolled steel (CRS) panels.
Figure 2A:
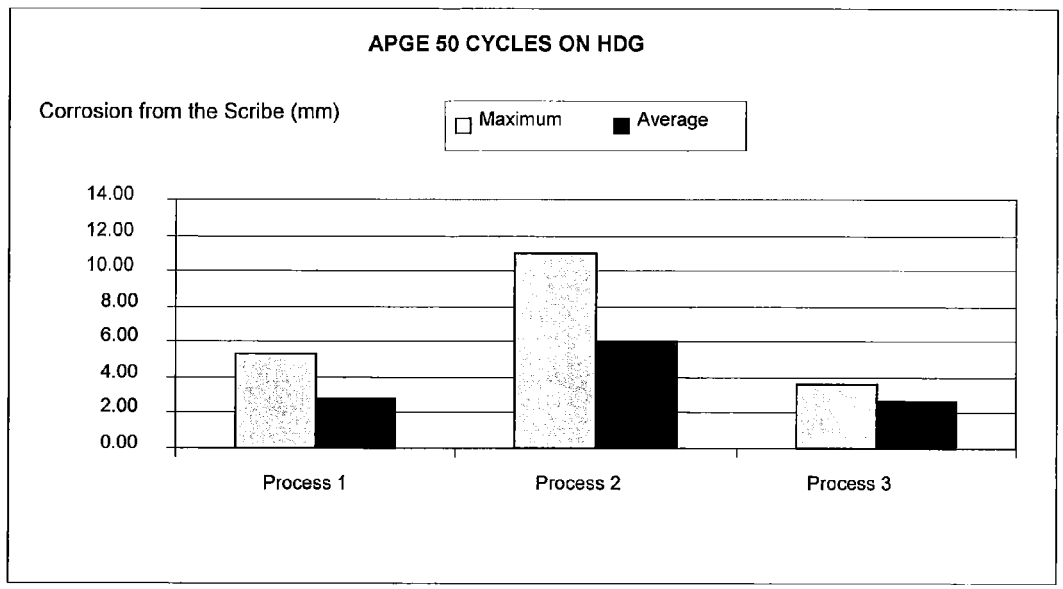
FIG. 2A shows corrosion test performance of hot-dip galvanized (HDG) steel panels.
Figure 2B:
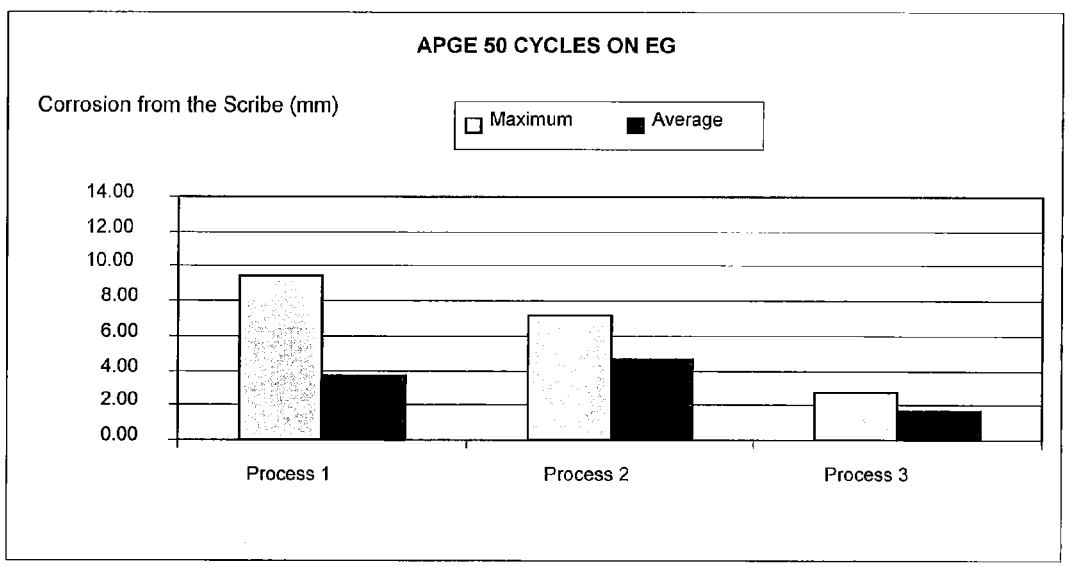
FIG. 2B shows corrosion test performance of electro galvanized (EG) steel panels.
Figure 2C:
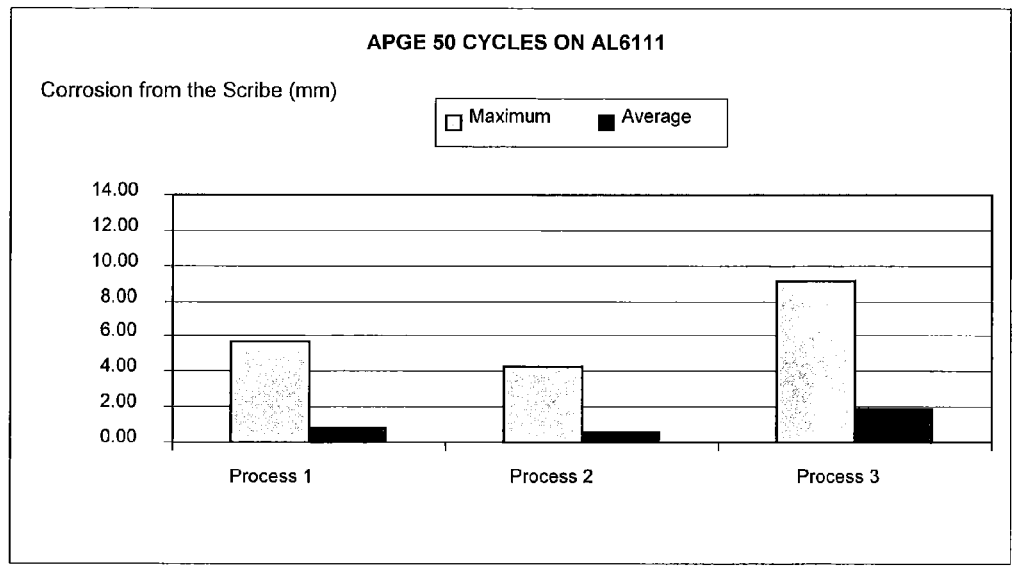
FIG. 2C shows corrosion test performance of aluminum alloy panels (Al6111)
Figure 2D:
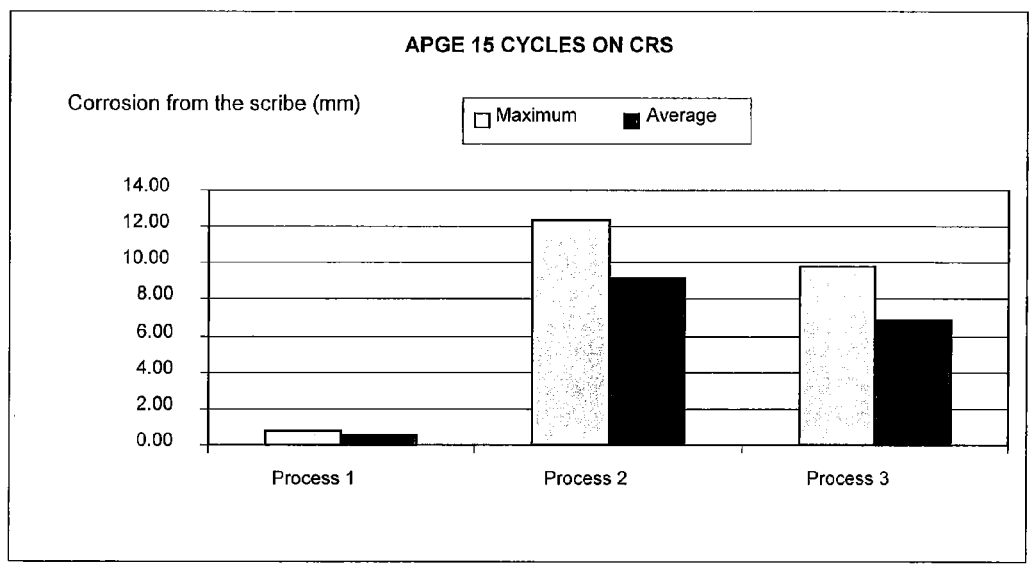
FIG. 2D shows corrosion test performance of cold rolled steel (CRS) panels.

The above corrosion results showed better corrosion resistance for HDG and EG, as shown by less scribe creep, as compared to the zirconium oxide control, and in several tests did as well or better than the zinc phosphate (Bonderite 958), which is a commonly used conversion coating for automotive. FIGS. 1 and 2 provide a graphic representation of improved results of inventive Process 3, as compared to Process 2 where the comparative metal article was coated with zinc, the zirconium-based metal pretreatment coating composition comprising dissolved Zr (TD-1323-HB) and paint in the absence of the alkaline pre-rinse. The testing also showed that the pre-rinse did not negatively affect corrosion resistance of the CRS panels, which is important to usefulness in using the same process for CRS and zinc surfaces and for metal articles made of CRS and zinc surfaces.

Example 2

Several proposed alkaline pre-rinse formulations were tested. The concentrate formulas are shown in Table 3 below.

TABLE 3

| Chemical | 1A | 2A | 3A | 4A | 5A | 6A |
|---|---|---|---|---|---|---|
| DI Water | 50.9 | 48.9 | 52.8 | 25.8 | 23.8 | 27.7 |
| Sodium Gluconate | 2.0 | 4.0 | 2.0 | 2.0 | 4.0 | 2.0 |
| Cobalt Nitrate Solution (13% Co) | 1.9 | 1.9 | 0.0 | 1.9 | 1.9 | 0 |
| Ferric Nitrate (14% Fe) | 1.3 | 1.3 | 1.3 | 1.3 | 1.3 | 1.3 |
| Sodium Hydroxide 50% Solution | 43.9 | 43.9 | 43.9 | | | |
| Potassium Hydroxide 45% Solution | | | | 68.6 | 68.6 | 68.6 |
| Sodium Silicate | | | | 0.4 | 0.4 | 0.4 |
| Total wt % | 100.0 | 100.0 | 100.0 | 100.0 | 100.0 | 100.0 |

Formulas 1A, 2A, 4A and 5A utilized Co and Fe, Formulas 3A and 6A used only Fe. Formulas 4A-6A used added silicate, Formulas 1A-6A were phosphate-free. Formulas 1A and 2A were comparable as were Formulas 4A and 5A, but for different levels of complexing agent.

Standard (12"×4") test panels were obtained from ACT Laboratories, Hillsdale, Michigan USA; Cold Rolled Steel (CRS), Electro-Galvanized Steel (EG), Aluminum 6111 (AL6111), Hot Dip Galvanized Steel (HDG). The process steps are outlined in Table 5, below. For each concentration and time in Table 4, below, three panels of each of the four substrates were treated.

TABLE 4

| Formula | Pre-rinse bath % | Time 1 (in pre-rinse) | Time 2 (in pre-rinse) |
|---|---|---|---|
| 1-A | 1 | 15 sec | 30 sec |
| | 4 | 15 sec | 30 sec |
| | 7 | 15 sec | 30 sec |
| | 10 | 15 sec | — |
| 2-A | 1 | 15 sec | 30 sec |
| | 4 | 15 sec | 30 sec |
| | 7 | 15 sec | 30 sec |
| | 10 | 15 sec | — |
| 3-A | 1 | 15 sec | 30 sec |
| | 4 | 15 sec | 30 sec |
| | 7 | 15 sec | 30 sec |
| | 10 | 15 sec | — |
| 4-A | 1 | 15 sec | 30 sec |
| | 4 | 15 sec | 30 sec |
| | 7 | 15 sec | 30 sec |
| | 10 | 15 sec | — |
| 5-A | 1 | 15 sec | 30 sec |
| | 4 | 15 sec | 30 sec |
| | 7 | 15 sec | 30 sec |
| | 10 | 15 sec | — |
| 6-A | 1 | 15 sec | 30 sec |
| | 4 | 15 sec | 30 sec |
| | 7 | 15 sec | 30 sec |
| | 10 | 15 sec | — |

TABLE 5

Processes steps:

| Process Step | Pretreatment Process | | |
|---|---|---|---|
| | Bonderite 958 Zinc phosphate (Control) | Standard Zr oxide coating process (Control) | Alkaline Pre-rinse + Standard Zr oxide coating process |
| Cleaning (PCL 1533) - Spray | 120 sec. | 120 sec. | 120 sec. |
| Warm Tap Water Rinse - Spray | 30 sec. | 30 sec. | 15 sec. |
| Conditioning (Fix-Z8) - Spray | 30 sec. | — | — |
| Alkaline Pre-rinse - Immersion | — | — | 15 or 30 sec. |
| Warm Tap Water Rinse - Spray | — | — | 30 sec. |
| DI Water Rinse - Spray | — | 30 sec. | 30 sec. |
| Pretreatment - Immersion | 120 sec. | 90 sec. | 60 sec. |
| DI Water Rinse - Spray | 30 sec. | 30 sec. | 30 sec. |

The test panels were e-coated wet-on-wet with DuPont's Cormax®VI e-coat.

Process Baths' Conditions

Cleaning (all Processes):

Parco Cleaner 1533 bath was built according to manufacturer's instructions, in 20 L spray tank. Free Alkalinity=5.5~6.6, Total Alkalinity=5.8~7.5, pH=11.2~12.3, Temperature=120° F. (49° C.).

Conditioning (for Bonderite®958 Process):

Fixodine Z8 bath was built at 1.2 g/L in 20 L spray tank. Filterable Ti=6 ppm, Total Ti=9 ppm, pH≈9.

Bonderite®958 Bath:

Free Acid=0.8, Total Acid=23.4, Accelerator=3.5, Free $F^-$=178 ppm, Zn=1000 ppm, Ni=900 ppm, Mn=570 ppm, Temperature=120° F. (49° C.).

Zirconium Oxide Coating Bath:

Same formulation used to process control panels and alkaline pre-rinsed panels:

Initial: Zr=159 ppm, Cu=24 ppm, pH=3.8~3.9, Free F-=-95~-100 RmV. Zirconium oxide coating bath parameters used for conversion coating were Zr 135-166 ppm, Cu 15 to 26 ppm, free fluoride in the bath was maintained between -97 and -110 RmV throughout the study, and pH was 3.75-4.25.

The alkaline pre-rinse bath conditions with each of the alkaline pre-rinse variations are given in Table 6.

TABLE 6

Alkaline pre-rinse bath conditions for each process variation.
Alkaline Pre-rinse Bath

| Variation | Concentration | Free Alkalinity | Total Alkalinity | pH | Temperature (° F.) |
|---|---|---|---|---|---|
| 1A (15 sec.) | 1% | 1.0 | 1.2 | 12.40 | 120 |
| | 4% | 4.3 | 4.6 | 12.88 | 120 |
| | 7% | 7.5 | 7.9 | 13.00 | 120 |
| | 10% | 10.8 | 13.0 | 13.30 | 120 |
| 1A (30 sec.) | 1% | 1.0 | 1.3 | 12.20 | 120 |
| | 4% | 4.2 | 4.6 | 12.70 | 120 |
| | 7% | 7.4 | 7.9 | 12.89 | 120 |
| 2A (15 sec.) | 1% | 1.0 | 1.2 | 12.22 | 120 |
| | 4% | 4.1 | 4.4 | 12.77 | 120 |
| | 7% | 7.2 | 7.6 | 12.97 | 120 |
| | 10% | 10.1 | 10.6 | 13.07 | 120 |
| 2A (30 sec.) | 1% | 1.1 | 1.3 | 12.33 | 120 |
| | 4% | 4.5 | 4.9 | 12.98 | 120 |
| | 7% | 7.8 | 8.2 | 13.22 | 120 |

TABLE 6-continued

Alkaline pre-rinse bath conditions for each process variation.
Alkaline Pre-rinse Bath

| Variation | Concentration | Free Alkalinity | Total Alkalinity | pH | Temperature (° F.) |
|---|---|---|---|---|---|
| 3A (15 sec.) | 1% | 0.9 | 1 | 12.24 | 120 |
| | 4% | 3.4 | 3.5 | 12.78 | 120 |
| | 7% | 6 | 6.3 | 12.97 | 120 |
| | 10% | 8.3 | 8.6 | 13.07 | 120 |
| 3A (30 sec.) | 1% | 1 | 1.3 | 12.35 | 120 |
| | 4% | 3.7 | 4 | 12.95 | 120 |
| | 7% | 6.5 | 6.8 | 13.14 | 120 |
| 4A (15 sec.) | 1% | 0.9 | 1.1 | 12.25 | 120 |
| | 4% | 3.6 | 4.0 | 12.83 | 120 |
| | 7% | 6.4 | 6.9 | 13.07 | 120 |
| | 10% | 9.1 | 9.8 | 13.23 | 120 |
| 4A (30 sec.) | 1% | 1.1 | 1.2 | 12.22 | 120 |
| | 4% | 3.8 | 4.1 | 12.87 | 120 |
| | 7% | 6.6 | 7 | 13.17 | 120 |
| 5A (15 sec.) | 1% | 1.3 | 1.4 | 12.38 | 120 |
| | 4% | 4.6 | 4.9 | 13.06 | 120 |
| | 7% | 8.0 | 8.9 | 13.29 | 120 |
| | 10% | 11.3 | 12.4 | 13.50 | 120 |
| 5A (30 sec.) | 1% | 1.2 | 1.4 | 12.58 | 120 |
| | 4% | 4.5 | 4.8 | 13.23 | 120 |
| | 7% | 7.8 | 8.3 | 13.47 | 120 |
| 6A (15 sec.) | 1% | 1.3 | 1.4 | 12.43 | 120 |
| | 4% | 4.6 | 4.8 | 13.05 | 120 |
| | 7% | 8.3 | 8.6 | 13.40 | 120 |
| | 10% | 11.6 | 12.1 | 13.58 | 120 |
| 6A (30 sec.) | 1% | 1.1 | 1.3 | 12.16 | 120 |
| | 4% | 4.5 | 4.7 | 12.86 | 120 |
| | 7% | 7.8 | 8.1 | 13.26 | 120 |

Corrosion Test Procedures

Ford APGE Cyclic Corrosion Testing (FLTM BI 123-01)–15 Cycles on CRS and 50 Cycles on EG, HDG, and AL6111.

General Motors Cyclic Corrosion Testing (GM9540P)–40 Cycles on all substrates.

Corrosion Performance on EG:

For the APGE test; in most of the variations EG experienced maximum corrosion of about 4-7 mm. There were a few instances were the maximum corrosion went above 7 mm. Formula 1A at 30 seconds and 4% concentration=15.49 mm, Formula 2A at 30 seconds and 4% concentration=12.00 mm, Formula 3A at 30 seconds and 7% concentration=8.70 mm. The average corrosion values for these three variations were comparable to other variations; all variations ranging within 4.62 mm at 1% and 15 sec. to 1.70 at 7% for 30 sec. Formula 2A at 15 seconds and 10% concentration, and at 30 seconds and 7% concentration showed the best results with maximum corrosion of about 3 mm.

In the GM9540P test, the maximum corrosion was mostly between about 3.5-5 mm Average corrosion ranged between 3.69 and 1.88 mm. Formula 5A at 15 seconds had ≤3 mm of maximum corrosion in all tested concentrations.

Corrosion Performance on HDG:

In APGE testing, most of the variations the average maximum corrosion is approximately 4-7 mm. In most cases the paint delamination was either drastically reduced or eliminated. In GM9540P the maximum corrosion was mostly around 4 mm.

The foregoing test results showed that the alkaline pre-rinses improved the corrosion performance of EG and HDG coated with a zirconium-based pretreatment and painted as compared to the same substrates coated and painted without the pre-rinse step. In some instances corrosion performance of the pre-rinsed substrates was comparable to zinc phosphate pretreatment and on average the pre-rinsed substrates appear to meet the required automotive manufacturer test specifications for corrosion resistance. The alkaline pre-rinse did not negatively impact corrosion performance for CRS. Formula 1A showed significant improvement at treatment time of 30 seconds for CRS. During processing it was found that the alkaline pre-rinse used cause increased metal etch on aluminum substrates, and thus would be suitable for non-aluminum articles and substrates.

The invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method for improving corrosion performance of a metal substrate comprising steps of:
   1.) providing a metal substrate comprising at least one zinc or zinc alloy surface;
   2.) contacting said zinc or zinc alloy surface for a contact time of from 2 to 60 seconds with an alkaline pre-rinse composition comprising:
      a) iron(III) ions in an amount of about 5 ppm to about 400 ppm;
      b) a source of hydroxide ion in an amount of about 0.5 g/l to about 4.0 g/l;
      c) at least one complexing agent selected from organic compounds which have at least one functional group —COOX, wherein X represents either an H or an alkali and/or alkaline earth metal;
      d) 0.0 to about 4 g/l cobalt (II) ions; and optionally
      e) a source of silicate:
      wherein the composition has a pH of at least 10;
   3.) optionally rinsing said zinc or zinc alloy surface;
   4.) applying to the metal substrate a zirconium-based metal pretreatment coating composition comprising zirconium for a contact time ranging from 30 to 180 seconds, thereby forming a zirconium oxide coating on all surfaces of the metal substrate including said at least one zinc or zinc alloy surface resulting in a zirconium oxide conversion coated substrate; and
   5.) optionally applying a paint to the metal pretreatment coated metal substrate.

2. The method of claim 1 wherein contact time of step 2.) is from 10 to 60 seconds and the alkaline pre-rinse composition has a temperature of 85 to 125 degrees F.

3. The method of claim 1 wherein the cobalt (II) ions are present in an amount of 1 ppm up to 200 ppm cobalt (II) ions.

4. The method of claim 1 wherein the alkaline pre-rinse composition is phosphate-free.

5. The method of claim 1 wherein the zirconium-based metal pretreatment coating composition further comprises 15 to 50 ppm dissolved Cu, fluoride and a chelating agent.

6. The method of claim 5, wherein the zirconium-based metal pretreatment coating composition comprises 50 to 300 ppm of dissolved Zr, 0 to 100 ppm of $SiO_2$, 150 to 2000 ppm of total Fluoride, 10 to 100 ppm of free Fluoride.

7. The method of claim 1 wherein the cobalt (II) ions are present in an amount of at least 25 ppm up to the solubility limit of the cobalt (II) ions.

8. The method of claim 7 wherein the iron(III) ions are present in an amount of about 15 ppm to about 200 ppm; and the source of hydroxide ion is present in an amount of about 0.75 g/l to about 4.0 g/l.

9. The method of claim 1 wherein the metal substrate is a hot dip galvanized or electro galvanized steel substrate.

10. A method for improving corrosion performance of a metal substrate comprising steps of:
    1.) providing a metal substrate comprising at least one zinc or zinc alloy surface;
    2.) contacting said surface with an alkaline composition comprising:
       a) iron(III) ions in an amount of about 5 ppm to about 300 ppm;
       b) a source of hydroxide ion in an amount of about 0.5 g/l to about 400 g/l;
       c) at least one complexing agent selected from organic compounds which have at least one functional group —COOX, wherein X represents either an H or an alkali and/or alkaline earth metal;
       d) 0.0 to about 4 g/l cobalt (II) ions; and
       e) optionally a source of silicate;
       wherein the composition has a pH of at least 10;
    3.) optionally water rinsing said surface;
    4. immediately after step 2) and optional step 3) if present, applying to the metal substrate a zirconium-based metal pretreatment coating composition comprising 50 to 300 ppm of dissolved zirconium and 15 to 50 ppm dissolved Cu, contact time ranging from 30 to 180 seconds, thereby forming a zirconium oxide conversion coating on the metal substrate including zirconium oxide conversion coating formed on the at least one zinc or zinc alloy surface;
    5.) water rinsing the zirconium oxide conversion coating;
    6.) optionally drying the substrate;
    7.) applying an initial paint layer to the zirconium oxide conversion coated metal substrate;
    8.) after step 7) applying at least one of a primer and a basecoat paint layer; and
    9.) after step 8) applying a clearcoat paint layer.

11. The method of claim 10 wherein the cobalt (II) ions are present in an amount of 1 ppm up to the solubility limit of the cobalt (II) ions.

12. The method of claim 10 wherein the source of hydroxide ion is present in an amount sufficient to provide a presence in the alkaline composition of about 0.5-3 g/L hydroxide.

13. The method of claim 10 wherein the source of silicate is present in an amount sufficient to provide silicate in an amount of about 30 ppm to about 1000 ppm.

14. The method of claim 10 wherein the source of hydroxide ion is present in an amount of about 0.5 g/l to about 3.0 g/l; and the cobalt (II) ions are present in an amount of 1 ppm to 200 ppm.

15. The method of claim 14 wherein the iron(III) ions are present in an amount of 90 ppm to about 182 ppm; and the cobalt(II) is present in an amount of about 1 ppm to 100 ppm.

16. A method for improving corrosion performance of a metal substrate comprising steps of:
    1). providing a metal substrate comprising at least one zinc or zinc alloy surface which is a hot dip galvanized or electro galvanized steel substrate;
    2). contacting said zinc or zinc alloy surface for a contact time of from 2 to 60 seconds with an alkaline pre-rinse composition having a temperature of 85 to 125 degrees F. and comprising:
       a) iron(III) ions in an amount of about 100 ppm to about 150 ppm;
       b) a source of hydroxide ion in an amount of about 2.5 g/l to about 2.75 g/l;

c) at least one complexing agent selected from organic compounds which have at least one functional group —COOX, wherein X represents either an H or an alkali and/or alkaline earth metal, in an amount of from about 100 ppm to about 150 ppm;
d) about 50 ppm to about 60 ppm cobalt (II) ions; and optionally
e) a source of silicate:
wherein the composition has a pH of from 12 to 12.5;
3). rinsing said zinc or zinc alloy surface;
4). applying to the metal substrate a zirconium-based metal pretreatment coating composition comprising 50 to 300 ppm of dissolved zirconium, 0 to 50 ppm pf dissolved Cu, 0 to 100 ppm of $SiO_2$, 150 to 2000 ppm of total Fluoride, 10 to 100 ppm of free Fluoride and optionally a chelating agent for a contact time ranging from 30 to 180 seconds, thereby forming a zirconium oxide coating on all surfaces of the metal substrate including said at least one zinc or zinc alloy surface resulting in a zirconium oxide conversion coated substrate; and
5). optionally applying a paint to the metal pretreatment coated metal substrate.

\* \* \* \* \*